Figure 1:
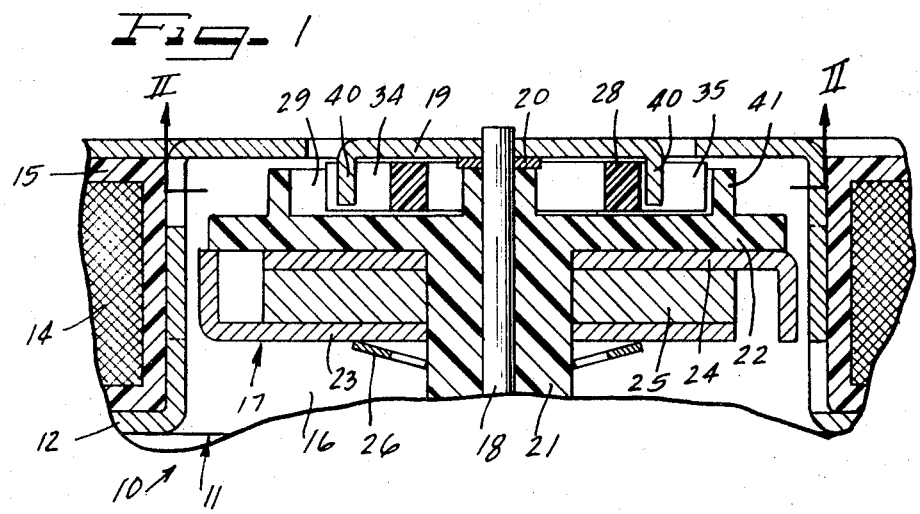

United States Patent [19]
Woolley

[11] 3,748,508
[45] July 24, 1973

[54] MOTOR CONSTRUCTIONS INCLUDING A SLIDING STOP MEMBER
[75] Inventor: Lee A. Woolley, Kokomo, Ind.
[73] Assignee: The Scott & Fetzer Company, Kokomo, Ind.
[22] Filed: Aug. 26, 1971
[21] Appl. No.: 175,100

[52] U.S. Cl. ................................................. 310/41
[51] Int. Cl. ............................................. H02k 7/10
[58] Field of Search ...................... 310/41, 162, 163, 310/164, 66, 156

[56] References Cited
UNITED STATES PATENTS
| | | | |
|---|---|---|---|
| 3,539,844 | 11/1970 | Linn | 310/41 |
| 3,416,014 | 12/1968 | Kuzara | 310/41 |
| 3,525,888 | 8/1966 | Linn | 310/41 |
| 3,448,308 | 6/1969 | Pervorse | 310/41 |

FOREIGN PATENTS OR APPLICATIONS
| | | | |
|---|---|---|---|
| 1,460,560 | 10/1966 | France | 310/41 |

Primary Examiner—R. Skudy
Attorney—Carlton Hill, Lewis T. Steadman et al.

[57] ABSTRACT

Asynchronous motor construction includes a sliding stop member for achieving unidirectional rotation, the motor having a rotor that includes a radially projecting ear integral with a rotor flange, and a stop member disposed between the rotor flange and the frame of the motor, the stop member having two pair of spaced parallel guide ears, each said pair defining a guide slot which receives guide means on the motor frame that project into such guide slots.

10 Claims, 6 Drawing Figures

PATENTED JUL 24 1973 3,748,508

SHEET 1 OF 3

INVENTOR.
LEE A. WOOLLEY

BY ATTORNEYS

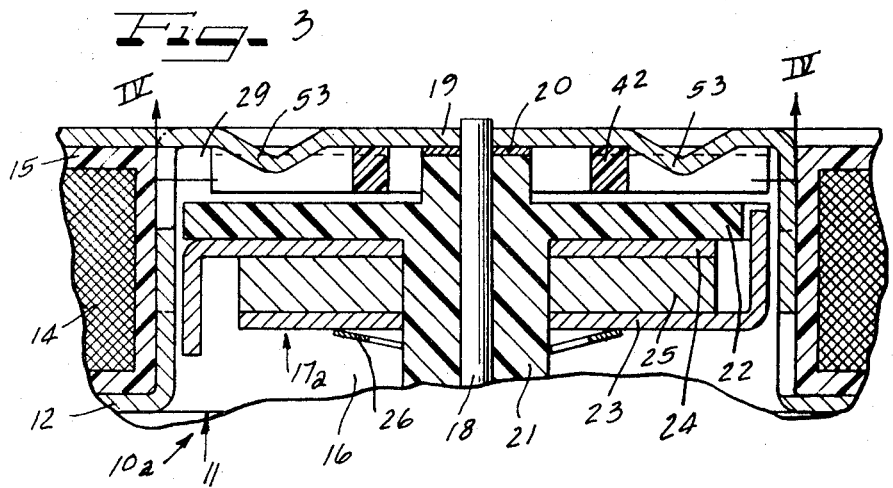
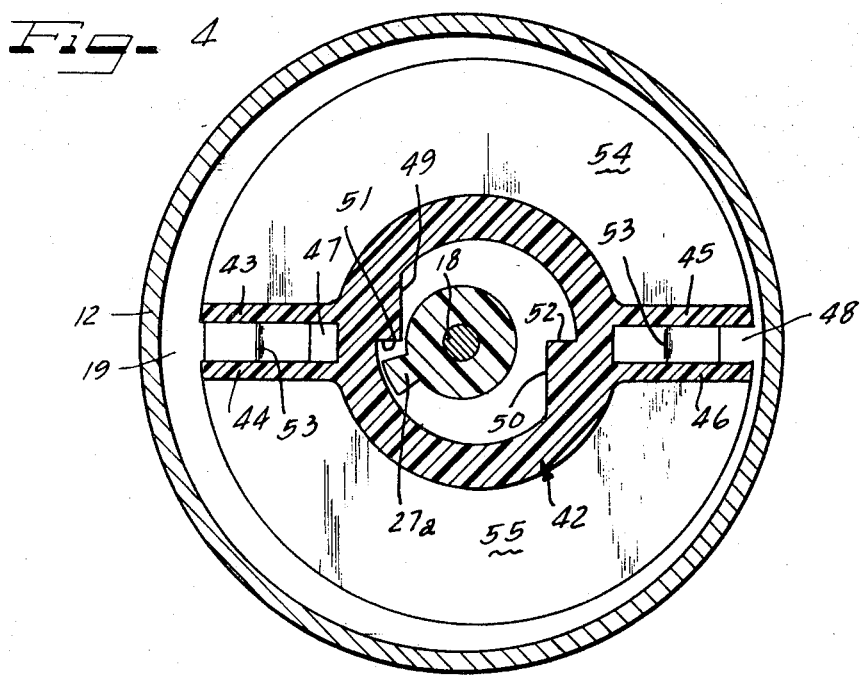

INVENTOR.
LEE A. WOOLLEY

MOTOR CONSTRUCTIONS INCLUDING A SLIDING STOP MEMBER

BACKGROUND OF THE INVENTION

1. Field of the Invention

This invention pertains to a mechanism by which a self-starting synchronous motor will run in only one direction.

2. Prior Art

In U.S. Pat. No. 3,307,056, issued to me on Feb. 28, 1967, there is disclosed a prior motor construction, such motor typically being utilized to operate appliance timers. In that device, a stop member is provided in the gear train, there being a flexible coupling between the motor's rotor, and the input pinion to the gear train. The various stop members disclosed therein are reciprocated by a finger carried by a gear. As a practical matter, motors constructed in accordance with a basic motor design are sold to various customers by the manufacturer of such motor, and the manufacturer must therefore adapt a particular motor so as to have the customer's desired speed of rotation of the output pinion from the gear train and also the correct direction of rotation. Thus to accommodate various customers, it has been necessary to modify not only the gear train, but also the directional control mechanism embodied therein, such modification being one to adapt the parameters to meet the specifications of a particular motor constructed in accordance with a certain principle.

SUMMARY OF THE INVENTION

In accordance with the present invention, the rotor has a flange and integral therewith is a radially projecting ear which cooperates with a stop member, the stop member being disposed between such rotor flange and the frame of the motor, the stop member having two pair of spaced parallel guide ears, each pair defining a guide slot receptive of guide means carried by the motor frame that project into such guide slots.

Accordingly, it is an object of the present invention to provide an improved synchronous electric motor.

Another object of the present invention is to provide means for ensuring unidirectional drive wherein the means are associated with the rotor and not with the gear train driven by such rotor.

A still further object of the present invention is to eliminate any need for a lost motion connection between the rotor and the gear train.

A still further object of the present invention is to minimize reaction time required to correct initial rotation in a wrong direction.

A still further object of the present invention is to avoid placing the stop menber at a location where torque could be high enough to damage a motor component.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

ON THE DRAWINGS

Figure 2:
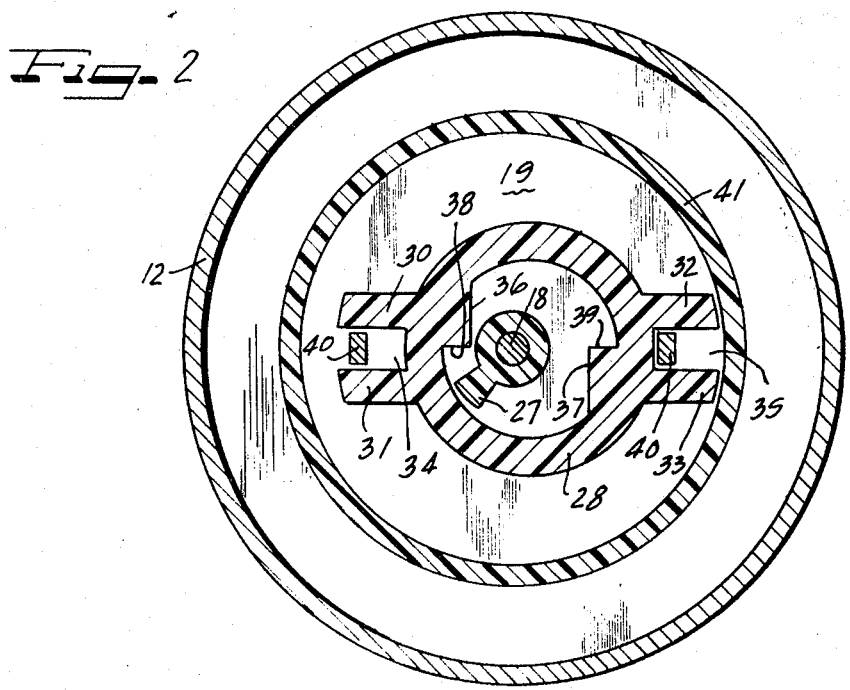
Figure 5:
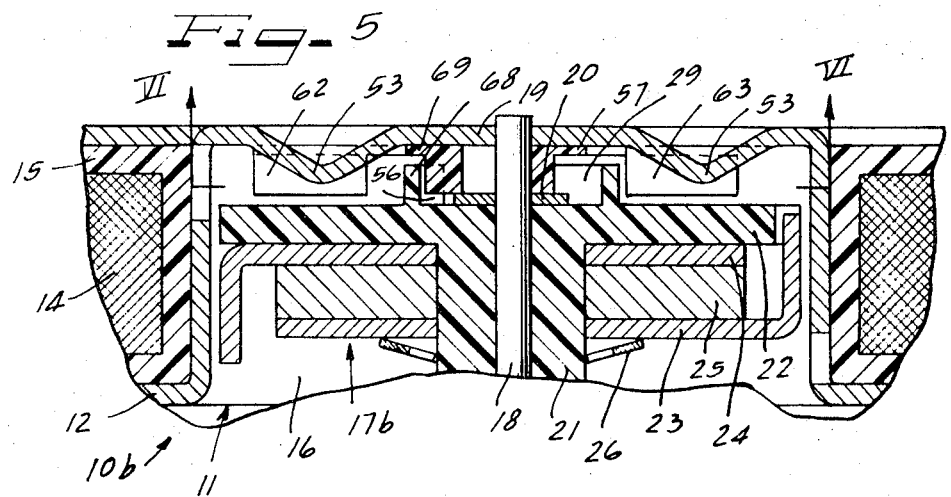
Figure 6:
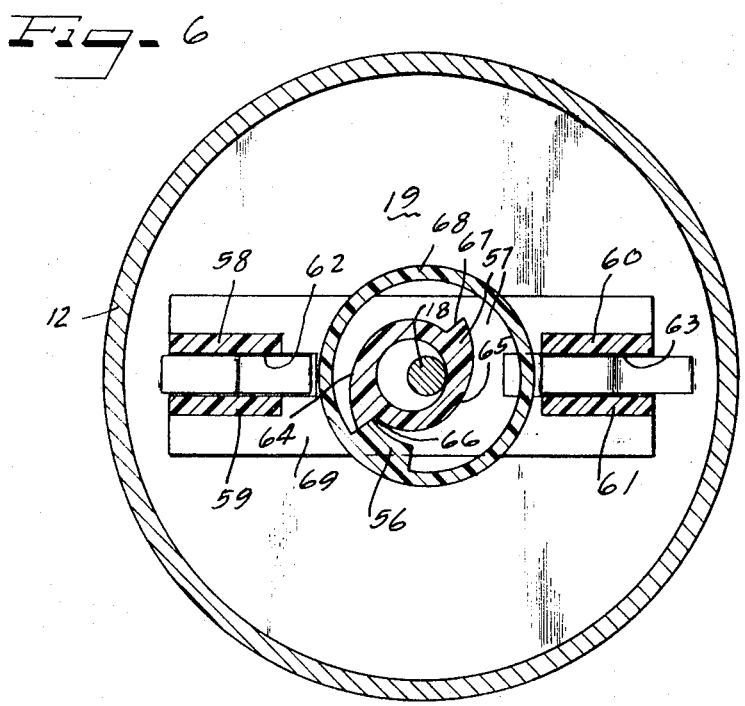

FIGS. 1, 3 and 5 are enlarged cross-sectional views of motor constructions provided in accordance with the principles of the present invention; and FIGS. 2, 4 and 6 are cross-sectional views taken respectively along lines II—II of FIG. 1, IV—IV of FIG. 3 and VI—VI of FIG. 5.

AS SHOWN ON THE DRAWINGS

The principles of this invention are particularly useful when embodied in a unitized synchronous electric motor assembly such as illustrated in FIG. 1, generally indicated by the numeral 10. The motor assembly 4 includes a motor section 11 and a gear train section (not shown). An electrical winding 14 is carried on a bobbin 15 on a frame 12 of the motor section 11, there being a rotor cavity 16 within which there is disposed a permanent magnet rotor assembly 17. A pin 18 is secured to an end wall 19 of the motor frame 12 and is disposed concentrically within the rotor cavity 16, and slidably and rotatably supports the rotor assembly 17. A thrust washer 20 engages the rotor assembly 17.

The rotor assembly 17 further includes a rigid plastic hub 21 which is directly coupled to the gear train, the hub 21 having an integral flange 22 which extends radially therefrom transversely to the rotational axis and which serves as a backing means for a stack of elements including a pair of magnetic pole plates 23,24 which are spaced apart by a permanent magnet 25. The pole plates 23,24 and the magnet 25 are arranged coaxially with the rotational axis of the rotor assembly 17 and are held securely against the flange 22 by appropriate retaining means such as a spring clip 26. For further information regarding the construction and operation of the components thus far described, the reader's attention is directed to my U.S. Pat. No. 3,307,056. For present purposes, it is sufficient to state that the rotor assembly 17 has the inherent ability to begin to rotate in either direction whenever the winding 14 is suitably energized. The description in this paragraph and the preceding paragraph is also directly applicable to the embodiments of FIGS. 3 and 5.

In accordance with the present invention, a mechanism is provided to ensure that the rotor of the synchronous electric motor will rotate in a predetermined or selected direction. To that end, in the embodiment shown in FIGS. 1 and 2, the hub 21 is provided with a radially projecting ear 27 which is also integral with the rotor flange 22. A stop member 28 is disposed in a recess 29 between the rotor flange 22 and the motor frame 19. As best seen in FIG. 2, the stop member 28 has two pair of spaced parallel guide ears 30–31 and 32–33, each pair of ears defining a guide slot 34,35. The stop member 28 has a pair of cam tracks 36,37 which are alternately engaged by the rotor ear 27 for reciprocating the stop member 28 to the left and right as shown. Each of the tracks 36,37 terminates in a transverse stop face 38,39, one of which is engaged by the rotor ear 27 when the rotor begins to rotate in the wrong direction. Guide means 40,40 on the motor frame project into the recess 29, and more specifically into the guide slots 34,35. The guide means 40,40 enable the stop member 28 to slide transversely to the rotational axis and at the same time the guide means 40,40 precludes any significant rotation by the stop member 28.

The rotor ear 27 extends radially away from the rotational axis of the rotor 17. Each of the cam tracks 36,37 and the stop faces 38,39 define the internal periphery of an aperture in the stop member 28 and as such partially surround the rotor ear 27. The cam tracks 36,37 are parallel to each other, and lie in opposite quadrants of the aperture in the stop member 28. The stop member 28 is invertible in the recess 29 to reverse the direction of desired rotation. A cylindrical flange 41 is secured to and forms and integral part of the rotor flange 22 and is concentric with the rotational axis and surrounds or encircles the rotor ear 27 and the cam tracks 36,37. The cylindrical flange 41 thus defines the recess 29 within which the stop member 28 is disposed. In that sense, the recess 29 is in the rotor 17. As shown, one of the cam tracks 36,37 is normally closer to the rotational axis than the maximum radial length of the rotor ear 27. Thus as viewed in FIG. 2, when the rotor rotates in a counterclockwise direction, the rotor ear 27 alternatively engages the cam tracks 36 and 37, and each time that it does engage one of these cam tracks, the stop member 28 is shifted from one extreme position to the other. In that sense, the rotor ear reciprocates the stop member 28 from within the stop member. If the rotor should being to rotate in the opposite direction, the rotor ear 27 will engage one of the stop faces 38,39, thereby by arresting movement in the wrong direction, and rebound in the correct direction to effect subsequent reciprocation of the stop member 28. In this embodiment, the guide means 40 comprises a pair of axially extending legs which are cut or lanced from the motor frame, and bent, the end of the leg at the bend remaining integral with the motor frame 19.

In the synchronous motor 10a shown in FIGS. 3 and 4, the rotor assembly 17a also has a radially projecting ear 27a integral with the rotor flange 22, and a stop member 42 in the recess 29 between the rotor flange 22 and the motor frame 19. The stop member 28 also has two pair of spaced parallel guide ears 43-44 and 45-46, each pair defining a guide slot 47,48. A pair of cam tracks 49,50 are alternately engaged by the rotor ear 27a for reciprocating the stop member 42, and each terminates in a transverse stop face 51,52 engaged by the rotor ear 27a. Guide means 53,53 on the motor frame 19 project into the recess 29 and the guide slots 47,48 to enable the stop member 42 to slide transversely to the rotational axis while precluding rotation of the stop member 42.

In the embodiment of FIGS. 3 and 4, the rotor ear 27a extends away from the rotational axis of the rotor, and each of the cam tracks 49,50 and the stop faces 51,52 jointly define an internal periphery in the stop member 42 and thus partially surround the rotor ear 27a. The stop member 42 is invertible in the recess 29 to reverse the direction of desired motor rotation. Thus the cam tracks 49,50 in part define an aperture in the stop member 42, the cam tracks 49,50 being parallel to each other and located in opposite quandrants in the aperture, one such cam track being closer to the rotational axis than the maximum radial length of the rotor ear. The rotor ear 27a can thus reciprocate the stop member from within the stop member 42. The stop member 42 has web means 54,55, the web 54 interconnecting the guide ear 43 with the guide ear 45 and the web means 55 interconnecting the guide ear 44 and the guide ear 46. The guide means 53 are strips, the ends of which are integral with the motor frame, the sides of which are lanced from the motor frame, and the length of which has been stretched or drawn to form the projection into the recess 29. The construction of the guide means is such that there are a pair of openings at the exterior side of each of said strips along their sides, and those openings are respectively closed by the guide means 43-46.

The construction shown in FIGS. 5 and 6 also includes a radially projecting ear 56, best seen in FIG. 6 which is integral with the rotor flange 22. A stop member 57 is disposed in the recess 29 between the rotor flange 22 and the motor frame 19. The stop member 57 also includes two pair of spaced parallel guide ears 58-59 and 60-61, each pair defining a guide slot 62,63. The stop member 57 further includes a pair of cam tracks 64,65 which are alternately engaged by the rotor ear 56 to effect reciprocation of the stop member 57. As before, each of the cam tracks 64,65 terminates in a transverse stop face 66,67 which is engaged by the rotor ear whenever rotation is initiated in the wrong direction. For example, as shown in FIG. 6, the rotor has rotated in a clockwise direction to engage the rotor ear 56 with the stop face 66. Guide means 53,53 are provided on the motor frame 19 and project into the recess 29 and the guide slots 62,63 and are functionally identical to the guide means 53 of FIG. 3.

In the embodiment of FIGS. 5 and 6 a cylindrical flange 68 is secured to the rotor flange 22 and is integral therewith, the flange 68 being concentric with the rotational axis and surrounding the rotor ear 56 and the cam tracks 64,65. Thus the rotor 17b has the cylindrical flange 68 which defines a recess within which at least part of the stop member 57 is located. Thus in that sense, the recess is in the rotor 17b. The ears 58-61 close the openings which are at the exterior side of the strips 53. Web means 69 interconnect the guide ears 58-61. In this embodiment, the rotor ear 56 extends radially toward the rotational axis and the cam tracks 64,65 and stop faces 66,67 are on an external periphery of the stop member 57 about which the rotor ear 56 can rotate. To achieve the relationship shown in FIG. 6, the rotor has turned in a counterclockwise direction with the rotor 56 engaging the cam track 65 to its maximum point, shifting the stop member 57 to the left and then the motor has been deenergized. Upon subsequent energization, the rotor began to rotate in a clockwise direction until the rotor ear 56 engaged the stop face 66 for just an instant as it rebounds immediately therefrom. The instant of engagement or rebound is the relationship illustrated in FIG. 6. The relationship of the components shown in FIG. 4 is that of a moment earlier, just before engagement of the ear 27a with the stop face 51 for rebound. The parts in FIG. 2 are also shown at this moment of operating cycle.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A mechanism for ensuring that a synchronous electric motor will rotate in a predetermined direction, comprising:
   a. a motor frame;
   b. a rotor rotatably supported on said frame and being capable of starting in either direction, said rotor having a radially projecting ear at one end thereof;

c. a stop member having two pair of spaced parallel guide ears, each pair defining a guide slot, having at least one cam track engageable by said rotor ear for reciprocation, said cam track terminating in a transverse stop face engageable by said rotor ear;

d. web means interconnecting a first of said guide ears of one of said pair with a first of said guide ears of the other of said pair, and a second of said guide ears of said one pair with a second of said guide ears of said other pair; and e. guide means on said motor frame projecting into said guide slots and enabling sliding movement transversely to the rotational axis while precluding angular movement thereof.

2. A mechanism according to claim 1 in which said radially projecting rotor ear extends toward the rotational axis, and in which said cam track and said stop face define an external periphery on said stop member about which said rotor ear can rotate.

3. A mechanism according to claim 1 in which said stop member has two of said cam tracks, which have straight portions extending parallel to each other and intersecting the stop faces, at least one of which is closer to the rotational axis than the maximum radial length of said rotor ear.

4. A mechanism for ensuring that a synchronous electric motor will rotate in a predetermined direction, comprising:

a. a motor frame having poles;

b. a rotor rotatably supported on said frame, and with a wall of said frame defining a recess at one end of said rotor, said rotor being capable of starting in either direction and said rotor having a radially projecting ear disposed in said recess;

c. a stop member disposed in said recess and having at least one pair of spaced parallel guide ears defining a guide slot, and at least one cam track engageable by said rotor ear for reciprocation, said cam track terminating in a transverse stop face engageable by said rotor ear; and d. guide means, lanced from said motor frame remotely from said poles, and having an axial extent projecting into said recess and into said guide slot for enabling said stop member to slide transversely to the rotational axis while precluding angular movement thereof.

5. A mechanism according to claim 4 in which said guide means comprises at least one strip whose sides are lanced from said motor frame, and whose ends are integral therewith, the length of said strip being drawn.

6. A mechanism according to claim 5 in which there is at least one opening into the interior of said frame at the exterior side of at least one such strip, said opening being closed by one of said guide ears.

7. A mechanism according to claim 4 in which said rotor has a cylindrical flange defining the periphery of said recess.

8. A mechanism according to claim 7 in which said rotor has a flange lying in a plane perpendicular to its rotational axis and supporting said cylindrical flange, said cylindrical flange being concentric with the rotational axis and disposed in surrounding relation to said rotor ear and said cam track.

9. A mechanism according to claim 8 in which said radially projecting rotor ear extends toward the rotational axis, and in which said cam track and said stop face define an external periphery on said stop member about which said rotor ear can rotate.

10. A mechanism according to claim 4 in which said stop member has two of said cam tracks, which have straight portions extending parallel to each other and intersecting the stop faces, at least one of which is closer to the rotational axis than the maximum radial length of said rotor ear.

* * * * *